(No Model.)
J. T. & T. C. HAYS.
MILK COOLER.
No. 377,675. Patented Feb. 7, 1888.
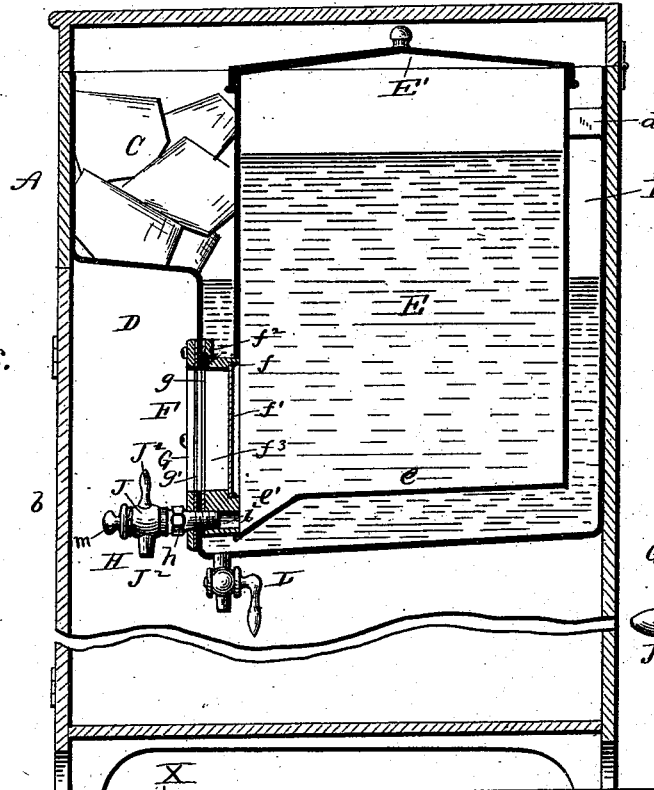
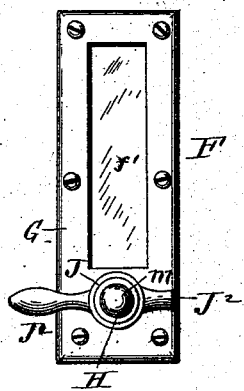
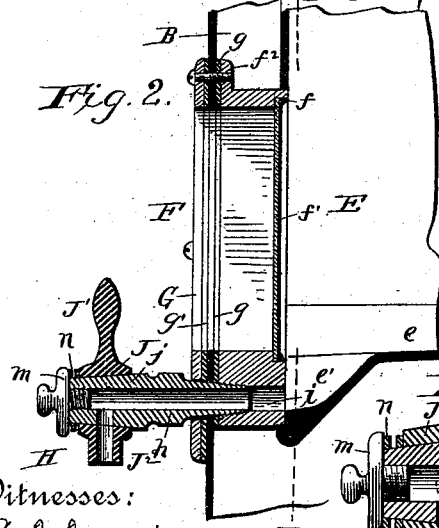
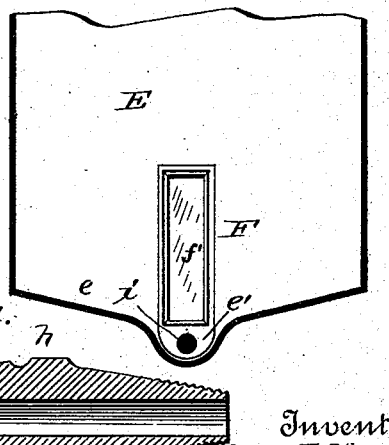
Witnesses:
C. D. Davis
Jno. S. Finch Jr.
Inventors:
James T. Hays and
Thomas C. Hays
By his Attorney
C. M. Alexander

UNITED STATES PATENT OFFICE.

JAMES T. HAYS, AND THOMAS C. HAYS, OF EMMITTSBURG, MARYLAND.

MILK-COOLER.

SPECIFICATION forming part of Letters Patent No. 377,675, dated February 7, 1888.

Application filed September 12, 1887. Serial No. 249,464. (No model.)

*To all whom it may concern:*

Be it known that we, JAMES T. HAYS and THOMAS C. HAYS, citizens of the United States, residing at Emmittsburg, in the county of Frederick and State of Maryland, have invented certain new and useful Improvements in Milk-Coolers, of which the following is a specification, reference being had therein to the accompanying drawings.

Our invention relates to certain novel improvements in milk-coolers known as "creamers," which improvements will be fully understood from the following description and claims, taken in connection with the annexed drawings, in which—

Figure 1 is a vertical central section through our improved creamer, taken from front to rear. Fig. 2 is an enlarged sectional view in detail, showing clearly the manner of constructing the window or gage-glass frame and the draw-off cock and combining the same with the milk-receptacle and the cooling-tank. Fig. 3 is a vertical cross-section through the lower part of the milk-receptacle, taken in the plane indicated by dotted line $x\,x$ on Fig. 2. Fig. 4 is a diametrical section through the draw-off cock for the milk and cream, representing the nozzle turned off. Fig. 5 is a front view of the gage-glass or window-frame with the draw-off cock applied to it. Fig. 6 is an edge view of the cock-spring.

Referring to the annexed drawings by letters, A designates the case of the creamer, which is preferably made of wood and constructed with a hinged cover, $a$, and a front door, $b$, as shown in Fig. 1.

Inside of case A is permanently or removably applied a tank, B, which is preferably made of galvanized iron, painted inside and out, and which is constructed so that part of it forms an ice-receptacle, C, having a bottom inclined inward or toward the main or water-receptacle part of the said tank, as clearly shown in Fig. 1, wherein it will be seen that the ice-box is offset from the tank-body, so as to leave a space, D, between the latter and the front door of the case A, for a purpose hereinafter explained.

Inside of the tank B, and isolated from its side and bottom walls, so as to leave a water-space, is the milk-can E, provided with a cover, E', and constructed of any suitable non-corrodible material. This milk-can E is suitably sustained in position by braces $d$, and it is constructed with a bottom, $e$, inclining from its rear wall forward to a cup or depression, $e'$, (shown in Fig. 1,) and also inclining from its side walls to its center, as shown in Fig. 3.

F designates a gage-glass or window-frame, which is preferably rectangular and oblong. This frame is constructed with a rabbet, $f$, in its inner edge, adapted to receive and have glazed into it a glass plate, $f'$. It is also constructed with a flange, $f^2$, and a portion, $f^3$, which is tightly fitted into an opening made through the front wall of the milk-can and hermetically soldered to the wall. Between the outer or flanged face of this window-frame F and the front wall of the receptacle B a packing, $g$, of a suitable material, is applied, and between the outer side of said wall and a frame, G, another packing, $g'$, is applied, so that by means of screws (shown in Figs. 1, 2, and 5) the window-frame is secured water-tight to the front wall of the cooling-receptacle B.

It is obvious that either the glass plate or the front of the frame G may be marked to afford a gage which would indicate at a glance the amount of cream in the milk-can after the milk has been drawn off through a cock, H. This cock consists of a body portion, $h$, having a straight bore extending from one end to the other. The externally-screw-threaded portion of this body is passed through the frame G, through the front wall of the cooling-receptacle, and is tapped into the outlet-passage $i$ of the window-frame F, thus serving to greatly assist the screws or bolts in securing the parts to the water-tank.

On the outer externally-tapered portion, $j$, of the cock-body is applied an internally-tapered sleeve, J, provided with a handle, J', and a nozzle, J², the bore of which is adapted to register with the outlet of the cock-body, as shown in Fig. 2. The sleeve J can be turned about the axis of the cock-body to draw the milk and cream and to cut off when desired.

For the purpose of keeping the sleeve J properly tight on its tapered seat, I employ a flanged screw, $m$, which is tapped into the outer end of the cock-body, and between the flange of said screw and the outer end of the sleeve J we apply a spring, *n*. (Shown in Fig. 6.) By this construction of a cock it can be readily cleaned and kept cleaned by passing a swab straight through it after removing the flanged screw *m*, and at the same time by means of the same swab the cupped depression $e'$ at the lowest point of the tank-bottom $e$ can be cleaned.

It will be seen from the above description that in operation the lower part of the milk-can is surrounded by cold water, which is kept cold by the drippings from the ice in the receptacle C of the cooling-tank B, and that the ice is not submerged in water, but arranged above it, so that it will not be rapidly melted and will keep the upper part of the can E cold by direct contact with it. Water can be drawn from this can from time to time as required by means of a cock, L. (Shown in Fig. 1.) It will also be seen that the lowest end of the transparent window-plate is in a horizontal plane with the lowest point of the inclined bottom $e$ of the milk-can E, and that the cock-outlet from this can is practically at the lowest point of the depression $e'$ in said bottom $e$. By these means cream unadulterated with milk can be drawn from the milk-can, and a person can readily observe through the window when all of the milk has been drawn from beneath the floating cream out of the can.

It will finally be observed that should the glass window-plate be broken it can be readily removed from the inside of its frame and a new plate substituted without unsoldering the frame from the milk-can, thus saving the expense of employing an experienced person to do the work. Finally, it will be seen that by offsetting the ice-receptacle C from the body of the cooler, as described, and shown in the annexed drawings, the cold air, which descends directly from the inclined bottom of said receptacle into the space below it, will be utilized for cooling the water in the receptacle below the ice.

By constructing the gage-glass frame in the manner described we provide a firm support for the lower end of the milk-can, whereby it is held suspended within the water-tank; we enable the gage-glass to be readily and quickly renewed, should it become broken, without the necessity of employing a mechanic for that purpose, and we provide a solid and adequate bearing for the draw-off cock, whereby the act of screwing the cock into place will serve to draw the parts closely together, the cock being thus utilized to greatly assist in holding the parts in place and in supporting the milk-can and relieving the bolts from strain.

Having thus fully described our invention, what we claim as new, and desire to secure by Letters Patent, is—

1. The combination, in a creamer, of the following instrumentalities: an external case, A, provided with a cover and a front door, a cold-water tank, B, therein, having an offset ice-receptacle, C, formed integral with this tank, a milk-can suspended in this tank and provided with a forwardly and laterally inclined bottom terminating in a depression, $e'$, integral with this bottom, a window-frame hermetically secured to the said tank and can, as described, a gage-glass glazed in a rabbet in the inner edge of this frame, and a straight-bore draw-off cock tapped into the outlet-passage $i$ of the window-frame at the lowest point of the depression $e'$, all constructed and adapted to operate substantially as described.

2. In a creaming-can, the combination of a water-tank, B, provided with an opening in its front wall, a milk-can, E, suspended within the said water-tank and provided in its front side with an opening similar to the one in the front side of the water-tank, a gage-glass frame, F, interposed between the milk-can and water-tank, and consisting of the portion $f^3$ and the flange $f^2$, the inner end of the former being attached securely to the milk-can within the opening therein, the gage-glass set in a rabbet in the inner end of the portion $f^3$ of the frame F, so as to be removable from within the milk-can, the frame surrounding the opening in the front side of the water-tank, the packings $g\ g'$ interposed between the frame G and flange $f^2$ and the front wall of the water-tank, the screws passing through the frame G, the packings, the front wall of the water-tank and the flange $f^2$, whereby the frame F is tightly secured to the front wall of the water-tank, and the draw-off cock H, provided with a screw-threaded end, the said cock being tapped into an opening, $i$, through the lower end of the body of the frame F and passing through the frame G and the front wall of the water-tank, whereby these parts are securely drawn together, substantially as described.

In testimony whereof we affix our signatures in presence of two witnesses.

JAMES T. HAYS.
THOMAS C. HAYS.

Witnesses:
ED D. SNIVELY,
HARRY WEANT.